(12) United States Patent
Mochizuki (10) Patent No.: US 6,752,532 B2
(45) Date of Patent: Jun. 22, 2004

(54) POSITIONING DEVICE WITH A SOLID CYLINDRICAL PIN

(75) Inventor: Masanori Mochizuki, Yao (JP)

(73) Assignee: Isel Co., Ltd., Yao (JP)

( * ) Notice: Subject to any disclaimer, the term of this patent is extended or adjusted under 35 U.S.C. 154(b) by 21 days.

(21) Appl. No.: 10/188,836

(22) Filed: Jul. 2, 2002

(65) Prior Publication Data

US 2003/0026646 A1 Feb. 6, 2003

(30) Foreign Application Priority Data

| Jul. 9, 2001 | (JP) | ................................. | 2001-207744 |
| Jul. 16, 2001 | (JP) | ................................. | 2001-215290 |
| Jun. 20, 2002 | (JP) | ................................. | 2002-179431 |

(51) Int. Cl.[7] .......................................... F16C 29/04
(52) U.S. Cl. ............................. 384/50; 384/52; 384/58; 403/14
(58) Field of Search .................... 384/26, 30, 41, 384/43, 44, 45, 49, 50, 51, 52, 53, 55, 56, 58, 59; 403/13, 14, 292, 294

(56) References Cited

U.S. PATENT DOCUMENTS

| 3,269,128 A | * | 8/1966 | Rusche | .................... | 405/247 |
| 3,347,603 A | * | 10/1967 | Ignatjev | .................... | 384/52 |
| 3,622,211 A | * | 11/1971 | Mitton | .................... | 384/56 |
| 4,346,945 A | * | 8/1982 | Tsuboi | .................... | 384/55 |
| 5,893,647 A | * | 4/1999 | Mochizuki | .................... | 384/51 |
| 6,568,853 B2 | * | 5/2003 | Mochizuki | .................... | 384/58 |

FOREIGN PATENT DOCUMENTS

| EP | 1213238 | * | 6/2003 |
| EP | 1215406 | * | 6/2003 |
| WO | 89/03276 | * | 4/1989 |

* cited by examiner

Primary Examiner—Thomas R. Hannon
(74) Attorney, Agent, or Firm—W. F. Fasse; W. G. Fasse (57) ABSTRACT

A guide apparatus (1) slidably supports a shaft member (2) and a column (3) relative to each other. The column (3) has a through hole (3a) formed therein and the shaft member (2) penetrates the through hole (3a). In the column (3), there is provided a slide mechanism (5) formed of a plurality of cylindrical rolling elements (50) adapted to roll axially on an outer circumference (2a) of the shaft member (2). The column (3) is formed of a plurality of split members (31, 32, 33, 34) that are divided on sectional planes each perpendicular to the axial direction of the column (3). A plurality of positioning pins (9) are provided on each contact surface of the adjacent split members (31, 32, 33, 34). The adjacent split members are centered or positioned relative to one another by the positioning pins (9).

13 Claims, 13 Drawing Sheets

POSITIONING DEVICE WITH A SOLID CYLINDRICAL PIN

BACKGROUND OF THE INVENTION

The present invention relates to a positioning device that can position or locate a member relative to the other member with higher accuracy. The invention also relates to a positioning device for a linear bearing or a guide apparatus for relatively slidably supporting an axially extending shaft member and a column receiving the shaft member.

In a machine tool, a conventional way to index one member relative to another member and position or locate it is to use a knock pin of which one end or particularly the distal end protrudes vertically from a contact surface of one of the two members, or to use triangular shaped teeth such as a serration or trapezoidal shaped teeth that are formed on both of the members.

In the case of a knock pin, especially a straight pin, when a distal end of the pin is fitted into a hole with a clearance fit, detachment of the pin from the hole becomes easy but positioning or locating of the two members with accuracy becomes difficult due to a clearance created between the pin and the hole. To the contrary, when a distal end of the pin is fitted into a hole with an interference fit, positioning or locating with accuracy becomes possible but attachment as well as detachment of the pin from the hole becomes difficult due to a tight fit of the distal end of the pin relative to the hole, thereby making coupling and decoupling of the two members difficult.

In the case of triangular or trapezoidal shaped teeth, positioning is achieved by contacting each tapered surface of a pair of opposed teeth between the two members. However, in this case, it is not easy to engage the tapered surfaces of the whole opposed teeth with each other with a uniform force, and thus, an index table may be made inclined. As a result, positioning with higher accuracy becomes difficult.

The present invention has been made under those circumstances and its first object is to provide a positioning device with higher accuracy. A second object of the present invention is to facilitate attachment and detachment of the members to be positioned in the positioning device.

On the other hand, a linear guide is conventionally used as a conveying device. A linear guide is generally comprised of a linearly extending rail, and a carriage that is translatable along the rail and that has a slide mechanism to slidably support the carriage on the rail.

In such a linear guide, a carriage needs boring or milling to form a through hole or a through groove for a rail to be inserted thereinto. However, when boring a hole or milling a groove in a carriage of one construction, in the case of a longer carriage, boring or milling cannot be finished in one process, thus necessitating each boring or milling process on opposite ends of the carriage separately. In this case, each center of the holes or the grooves on both ends of the carriage may be offset or shifted, and boring or milling accuracy cannot be secured.

On the other hand, when a longer carriage is formed of a plurality of shorter carriage members that are connected to each other by a through bolt, in the case of a through hole or a through groove of polygonal cross sectional shape, each polygonal cross sectional shape of the carriage members may not be precisely conformed to each other, and similarly, boring or milling accuracy of the carriage cannot be secured. Thus, there were limitations on boring or grooving accuracy and positioning accuracy in a prior art linear guide with a longer carriage.

The present invention has also been made under those circumstances and its third object is to provide a positioning device for a guide apparatus that can produce a longer carriage easily and accurately.

SUMMARY OF THE INVENTION

A positioning device according to one aspect of the present invention includes a first member having a first, flat contact surface and a second member having a second, flat contact surface adapted to contact the first contact surface. The first contact surface has a plurality of first grooves formed thereon, each of which extends along the first contact surface and has U-shaped or circular cross section. The second contact surface has a plurality of second grooves formed thereon, each of which extends along the second contact surface, has U-shaped or circular cross section and is disposed at a position corresponding to each of the first grooves. Solid cylindrical positioning pins fitted into the corresponding first and second grooves are in contact with each opening edge of the first and second grooves and they position or locate the first and second members relative to each other.

In this case, since the first and second members are positioned relative to each other through the cylindrical positioning pins disposed along the first and second contact surfaces with the first and second contact members contacted with each other, each contact surface will not be inclined and highly accurate positioning becomes possible.

Also, in this case, each positioning pin fitted into each groove of the first and second member is in linear contact with the opening edge portion of the groove along its generating line, thereby facilitating attachment and detachment of the positioning pin relative to the groove, and thus, coupling and decoupling of the first and second members can become easy.

A positioning device according to another aspect of the present invention is provided for a guide apparatus adapted to slidably support a shaft member and a column or carriage relative to each other. The column has an axially extending through hole or through groove and the shaft member is inserted into the through hole or through groove. A slide mechanism with a plurality of rolling elements is provided between the column and the shaft member to slidably support the column relative to the shaft. The column is formed of a plurality of split members that are divided at sections orthogonal to the axial direction and that are connected to each other. A plurality of supporting grooves each having U-shaped or circular cross section are formed on each contact surface of each adjacent split member, and corresponding supporting grooves are oppositely disposed on the contact surfaces of the adjacent split members. Each split member is positioned or centered by cylindrical positioning pins inserted into the oppositely disposed supporting grooves.

In this case, since the column is composed of a plurality of split members connected to each other in the axial direction, by predetermining an axial length of each split member at an appropriate length that allows for boring or milling with higher accuracy, boring or milling process of each split member can be conducted accurately. Moreover, in this case, since each split member is centered by the positioning pins extending along the contact surfaces, each through hole or through groove of the split members can be centered or located accurately when having composed a column from split members by connecting them in the axial direction. In such a way, a column of a longer length can be manufactured with ease and accuracy.

BRIEF DESCRIPTION OF THE DRAWINGS

For a more complete understanding of the invention, reference should be made to the embodiments illustrated in greater detail in the accompanying drawings and described below by way of examples of the invention. In the drawings, which are not to scale.

DETAILED DESCRIPTION OF THE PREFERRED EMBODIMENTS

Figure 1:
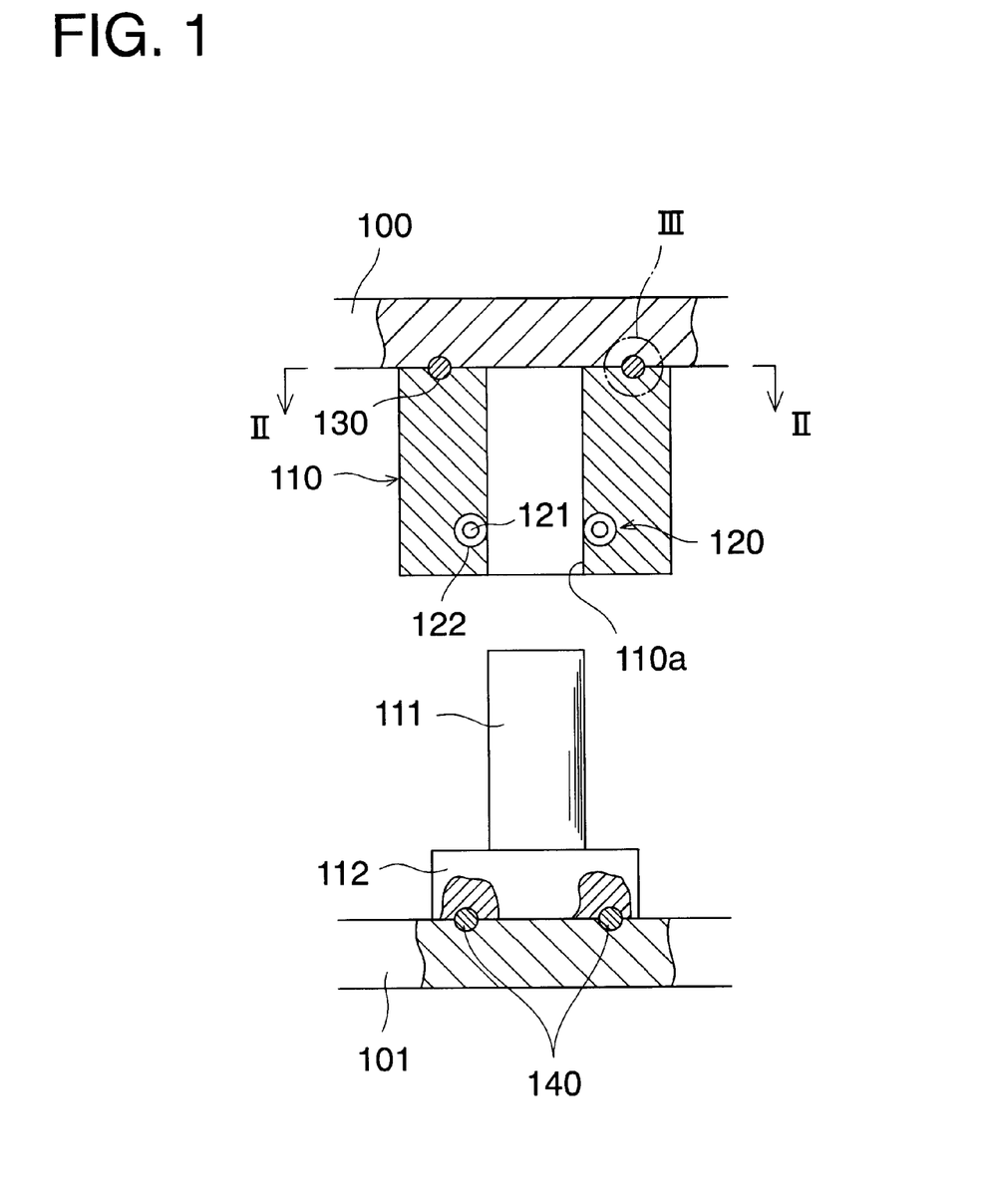
FIG. 1 is a schematic view of a guide apparatus for a die set of a press incorporating a centering mechanism according to one embodiment of the present invention.

Turning now to the drawings, FIG. 1 shows a guide apparatus for a die set of a press incorporating a positioning device according to an embodiment of the present invention.

As shown in FIG. 1, this guide apparatus for a die set includes an upper base 100 and a lower base 101 that are located away from each other in the vertical direction. The upper base 100 is vertically translatable. A guide bushing 110 is fixed to the upper base 100. A guide post 111 is fixed to the lower base 101 at its proximal end portion 112. The guide post 111 is slidable in a central through hole 110a formed in the guide bushing 110. A plurality of rolling members 120 are provided in the through hole 110a of the guide bushing 110. Each of the rolling members 120 is formed of a supporting shaft 121 and a cylindrical outer race 122 rotatable around the shaft 121 and adapted to roll vertically along the outer circumference of the guide post 111 inserted into the through hole 110a.

Additionally, in this guide apparatus, a punch (not shown) is fixed to the upper base 100, a die (not shown) disposed opposite the punch is fixed to the lower base 101, and a pair of die set is composed of these punch and die.

Figure 2:
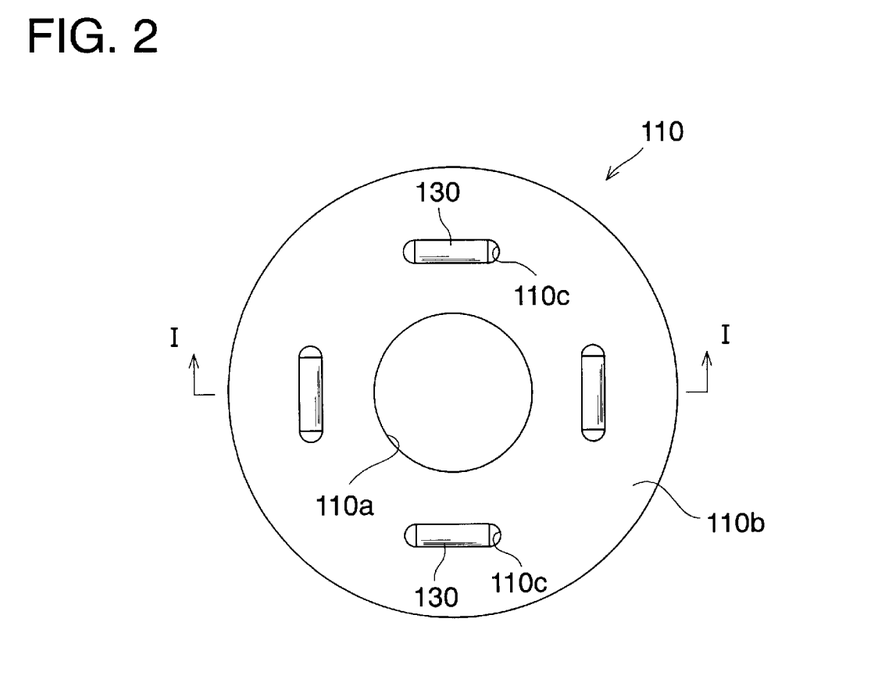
FIG. 2 is a schematic as viewed from line II—II of FIG. 1.
Figure 3:
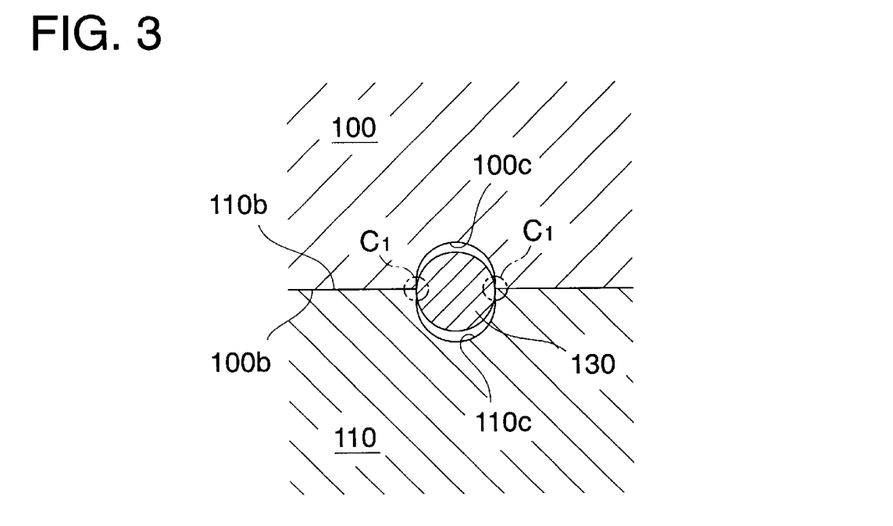
FIG. 3 is an enlarged view of a portion III of FIG. 1.

A plurality of locating pins 130 are provided on each contact surface of the upper base 100 and the guide bushing 110. As shown in FIGS. 2 and 3, a contact surface 110b of the guide bushing 110 is formed with four grooves 110c each extending along the contact surface 110b and having generally semicircular shape or U-shape in cross section. These grooves 110c are placed at equal circumferential spacings from each other. Similarly, a contact surface 100b of the upper base 100 is formed with four grooves 100c each extending along the contact surface 100b and having generally semicircular shape or U-shape in cross section. These grooves 100c are placed at equal circumferential spacings from each other, and each of them corresponds to or oppositely facing each of the grooves 110c of the guide bushing 110. A cylindrical pin 130 is fitted into each corresponding or oppositely disposed groove 100c, 110c.

As shown in FIG. 3, at the time of fitting of the pin 130 into the grooves 100c, 110c, each opening edge $C_1$ of the grooves 100c, 110c is preferably in contact with opposite side surfaces of the pin 130 with gaps formed between each bottom portion of the grooves 100c, 110c and the pin 130. Thereby, the contact surfaces 100b, 110b can securely come into contact with each other without any gaps between them. Therefore, cross sectional shape of each of the grooves 100c, 110c is preferably U-shaped, or slightly elongated semicircular toward the bottom portion of the groove rather than being a complete semicircle. In FIG. 3, a gap between the pin and the groove is illustrated somewhat exaggeratingly for illustration purposes.

Turning back to FIG. 1, on the contact surfaces between the lower base 101 and the proximal end portion 112 of the guide post 111, a plurality of locating pins 140 similar to pins 130 are provided. The pins 140 are fitted into a plurality of grooves of U-shaped or semicircular cross sectional shape formed on each contact surface between the lower base 101 and the proximal end portion 112 of the guide post 111.

In such a manner, by positioning the guide bushing 110 relative to the upper base 100 through the pins 130, and also, by positioning the guide post 111 relative to the lower base 101 through the pins 140, the guide post 111 can be positioned in place relative to the guide bushing 110. Thereby, during press working, accurate linear motion of the guide apparatus can be achieved.

In this case, the upper base 100 and the guide bushing 110 are positioned by a plurality of cylindrical pins 130 provided along each contact surface 100b, 110b of the upper base 100 and the guide bushing 110 with each contact surface 100b and 110b contacted to each other. Thereby, each contact surface 100b, 110b will not be inclined, and thus, locating with higher precision becomes possible.

Similarly, the lower base 101 and the guide post 111 are positioned by a plurality of cylindrical pins 140 provided along each contact surface of the lower base 101 and the guide post 111 with each contact surface contacted to each other. Thereby, each contact surface will not be inclined, and thus, locating with higher precision becomes possible.

Moreover, in this case, each pin fitted into each groove is engaged with the groove along a generating line of the pin. In other words, a pin and a groove are in linear contact with each other, thereby facilitating attachment and detachment of each pin relative to each groove. Thus, coupling and decoupling of the guide bushing 110 relative to the upper base 100 become easy. Coupling and decoupling of the guide post 111 relative to the lower base 101 become easy, too.

Figure 4:
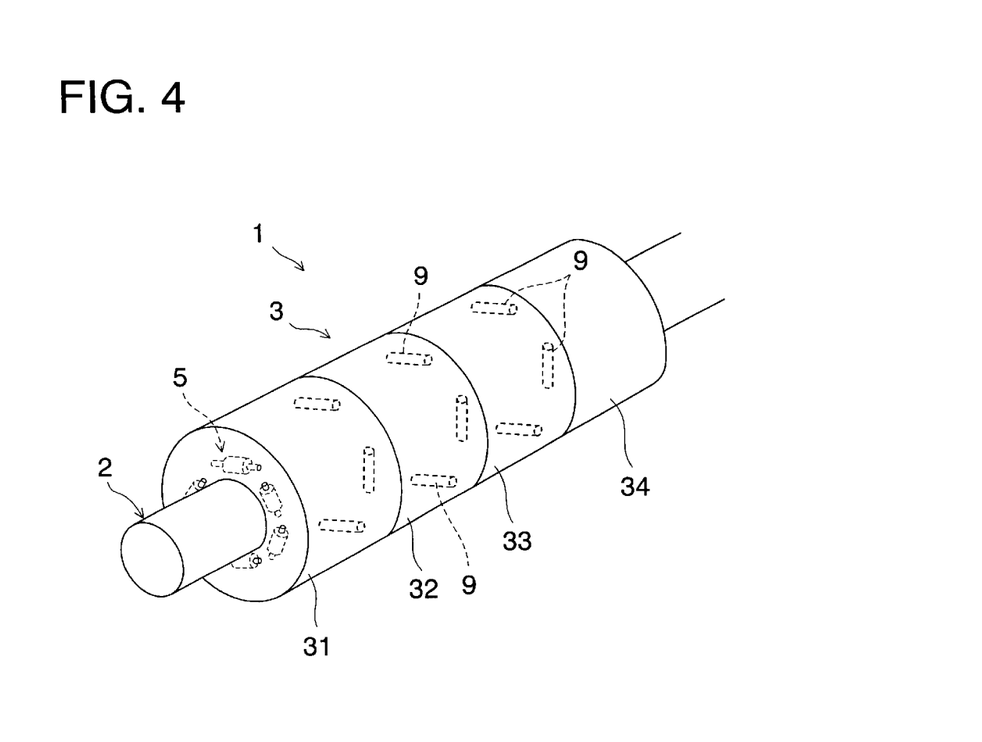
FIG. 4 is a perspective view of another guide apparatus incorporating a centering mechanism of the present invention.
Figure 5:
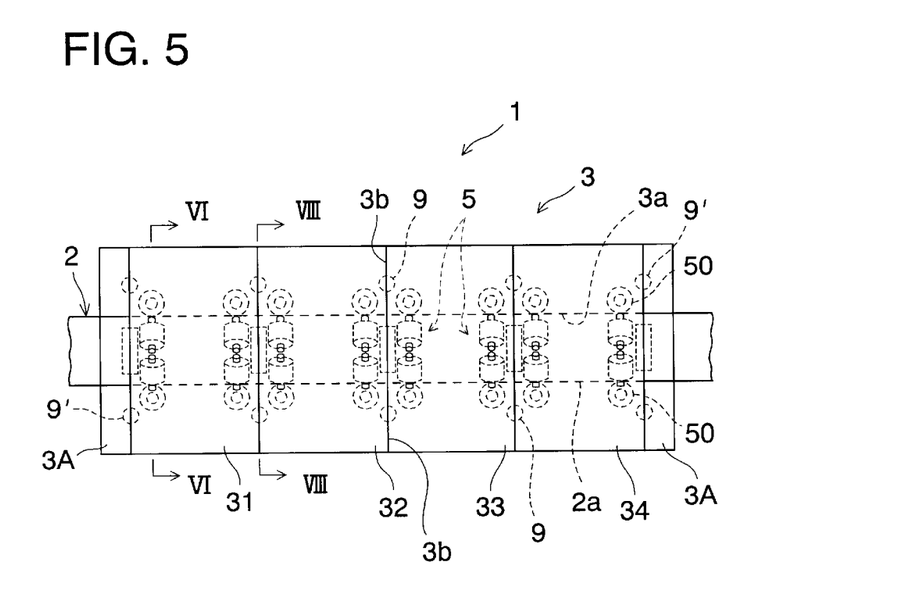
FIG. 5 is a side view of the guide apparatus of FIG. 4.

FIG. 4 illustrates another guide apparatus incorporating a positioning device of the present invention, and FIG. 5 is a side view of FIG. 4.

As shown in FIGS. 4 and 5, a guide apparatus 1 includes a round shaft member 2 extending in an axial direction, and a cylindrical column 3 mounted around and movable along the shaft member 2.

The column 3 is composed of a plurality of split members 31, 32, 33 and 34 that are divided on sections each perpendicular to the axial direction and that are axially connected to each other. Each split member 31–34 has an axially extending through hole 3a of round cross section. The shaft member 2 penetrates through each through hole 3a of the split members 31–34. On opposite ends of the column 3, shown in FIG. 5, a thin split column or end plate 3A may be provided. In FIG. 4, the end plates 3A are not shown.

A slide mechanism 5 is provided in each split member 31–34 to slidably support each split member 31–34 relative to the shaft member 2. The slide mechanism 5 is disposed at opening portions of each through hole 3a at opposite ends of each split member 31–34. In FIG. 4, only a portion of a slide mechanism 5 provided at the split member 31 is shown for illustration purposes.

Figure 6:
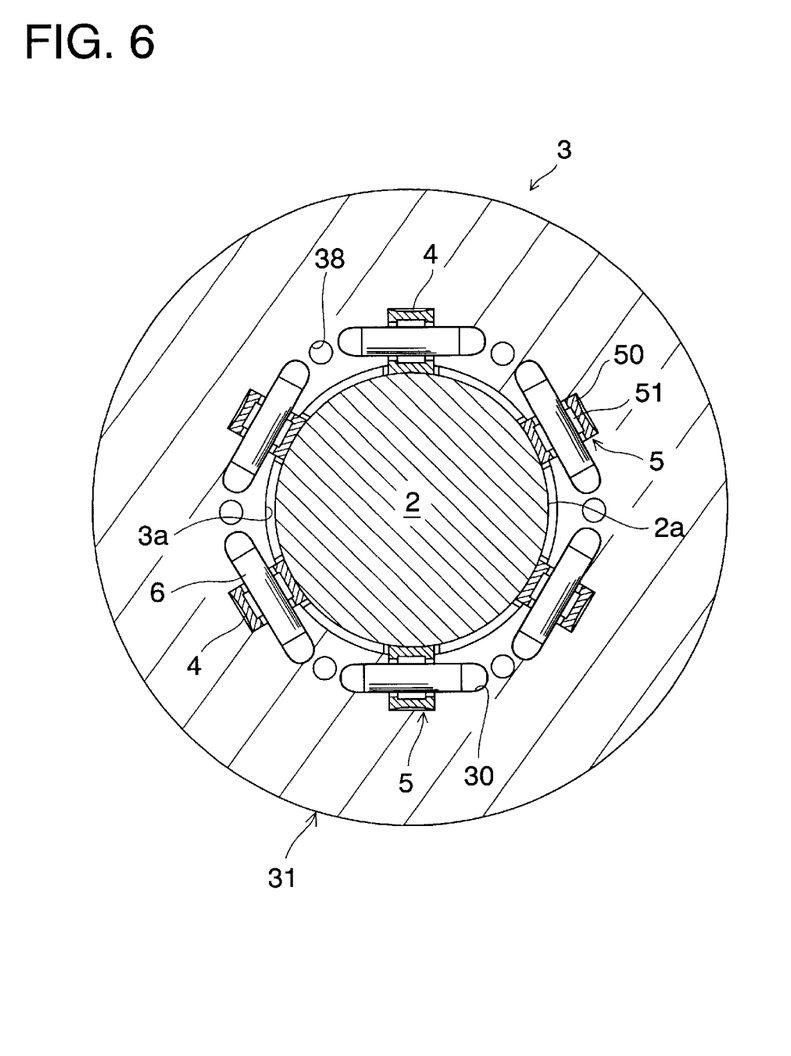
FIG. 6 is a sectional view of FIG. 5 taken along line VI—VI.

The slide mechanism 5, shown in FIG. 6, is formed of six cylindrical rollers 50 placed at equal circumferential spacings from each other. The rollers 50 are housed in six pockets 4 formed on an inner circumferential surface of the through hole 3a at equal circumferential spacings from each other. Each roller 50 is adapted to roll along an outer circumferential surface 2a of the shaft member 2 in the axial direction or the perpendicular direction to FIG. 6.

Figure 7:
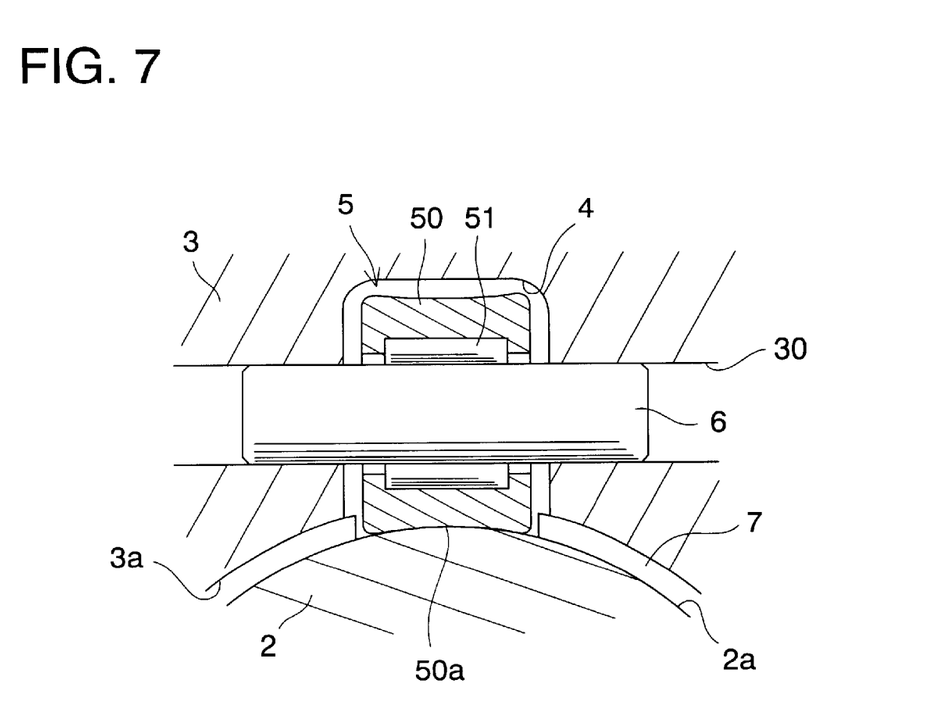
FIG. 7 is an enlarged view of a portion of FIG. 6.

As shown in FIG. 7, an enlarged view, each one of the cylindrical rollers 50 is rotatably supported around a supporting shaft 6 through a plurality of needle rollers 51 provided along an outer circumferential surface of the supporting shaft 6. The supporting shaft 6 is received in a hole 30 formed in the column 3.

The cylindrical roller 50, preferably, has a concavely curved cylindrical surface 50a. In other words, a generating line of the cylindrical surface 50a is concavely curved. Also, preferably, the cylindrical surface 50a of the cylindrical roller 50 has a radius of curvature slightly greater than a radius of curvature of the outer circumferential surface 2a of the shaft member 2. Thereby, a contact area with the outer circumferential surface 2a of the shaft member 2 increases. Thus, surface pressure of a rolling surface can be decreased, wear resistance can be improved, and applicable load can be increased.

In addition, a thin-walled, cylindrical member 7 is interposed between the outer circumferential surface 2a of the shaft member 2 and the inner circumferential surface of the through hole 3a of the column 3 to sustain a radial load applied between the shaft member 2 and the column 3. Also, each split member 31–34 of the column 3 is connected and fastened to each other by a through bolt (not shown) inserted into an axially extending through hole 38, shown in FIG. 6.

Figure 8:
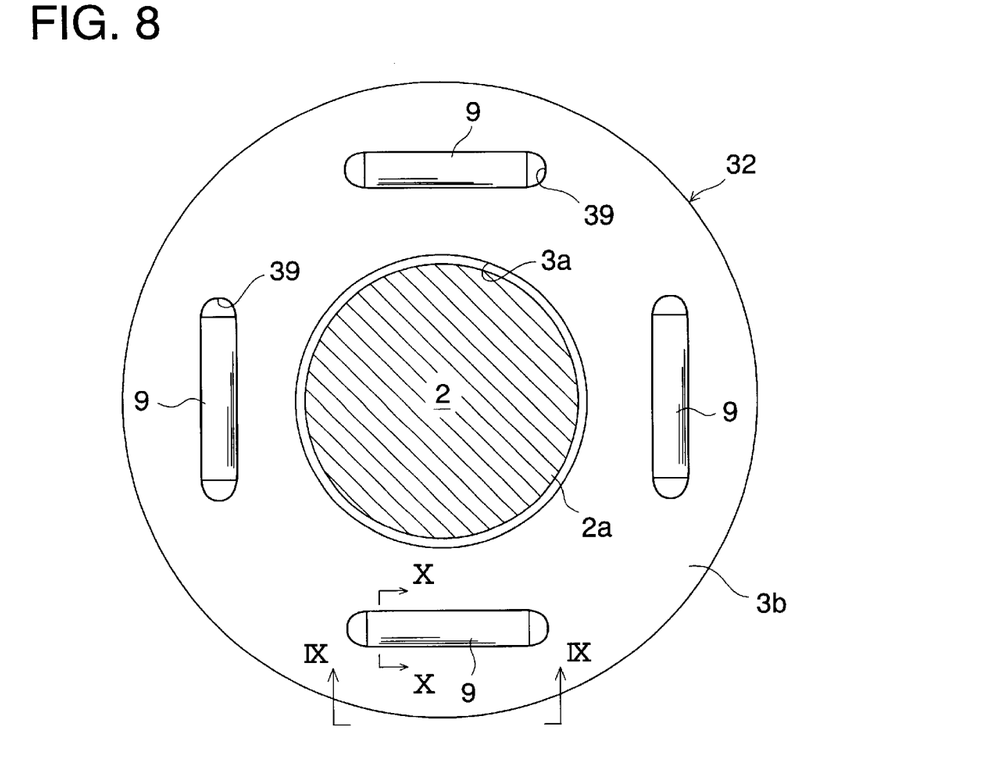
FIG. 8 is a sectional view of FIG. 5 taken along line VIII—VIII.
Figure 9:
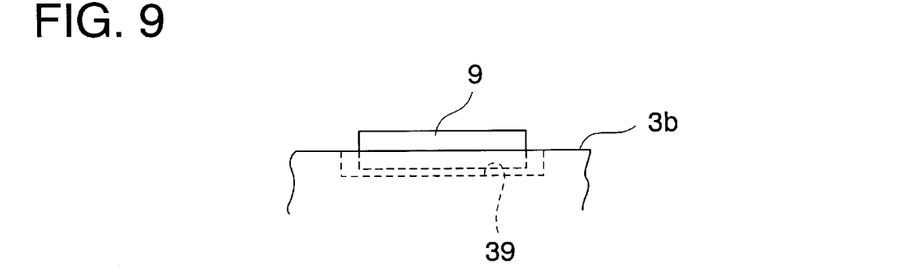
FIG. 9 is a schematic as viewed from line IX—IX of FIG. 8.
Figure 10:
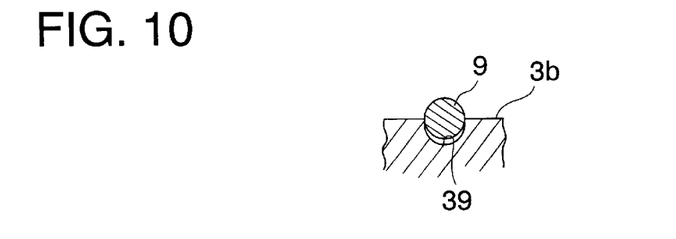
FIG. 10 is a sectional view taken along line X—X of FIG. 8, showing a fitting condition of a first positioning pin.

As shown in FIG. 8, there are four, first positioning pins 9 equally circumferentially spaced embedded on each contact surface 3b of the adjacent split members. In the same manner as the above-mentioned embodiment, each positioning pin 9, shown in FIGS. 9 and 10, is fitted into a supporting groove 39 of semicircular shape or U-shape in cross section formed on the contact surface 3b of one of the adjacent split members. A portion of the positioning pin 9 protruded from the contact surface 3b is adapted to fit into a supporting groove 39 of semicircular shape or U-shape in cross section formed on the contact surface 3b of the other of the adjacent split members. A fitting condition between each positioning pin 9 and each supporting groove 39 is similar to a fitting condition between each pin 130 and each groove 100c, 110c, shown in FIG. 3.

In this way, each corresponding supporting groove 39 faces to each other in the adjacent split members to form a supporting hole to receive each positioning pin 9. Thereby, each positioning pin 9 functions as a knock pin and thus, the adjacent split members will be centered.

According to this embodiment, since the column 3 is composed of a plurality of split members 31–34 connected axially to each other, by predetermining each length of the split members 31–34 to be appropriate length that allows for boring with higher accuracy, each boring process of each of the split members 31–34 can be conducted accurately. Also, in this case, since the split members 31–34 are centered by pins 9, each hole 3a of the split members 31–34 is accurately centered or located when the column 3 has been assembled from the split members 31–34. Thereby, a column with a longer length can be made with ease and accuracy.

Moreover, in this case, at the time of centering the split members 31–34, each positioning pin 9 comes into contact with the opening edge portions of the adjacent supporting grooves. Thus, each split member is positioned with each contact surface 3b of the adjacent split members contacted to each other. Thereby, each contact surface 3b will not be tilted, and thus, positioning with higher precision becomes possible.

The split members 31–34 may be divided at sections passing through each center line of the supporting shafts 6. In this case, each supporting shaft 6 can act as a centering pin to position or center adjacent split members, which eliminates the necessity for providing positioning pins 9. Thereby, the number of components can be decreased and the whole structure is simplified. Moreover, in this case, the split members can be divided at each center line of the supporting shafts 6, thus facilitating exchange of a slide mechanism 5 including a cylindrical roller 50 and needle rollers 51.

On the other hand, each end plate 3A disposed on the opposite ends of the column 3 is positioned by the positioning pins 9' relative to the adjacent split columns 31, 34. The positioning pins 9' are spaced equally on each contact surface.

Figure 11:
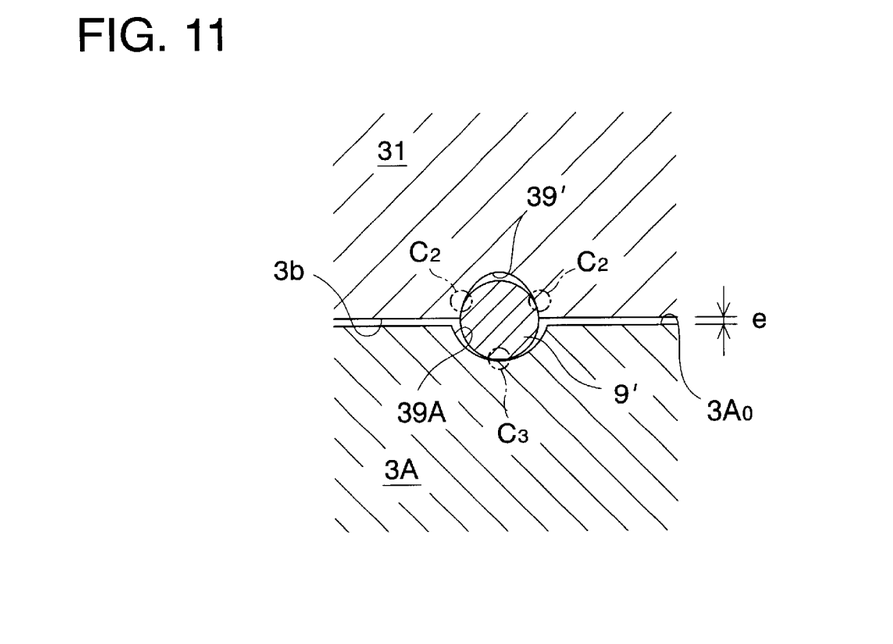
FIG. 11 shows a variant of FIG. 3, showing a fitting condition of a second positioning pin.

Each positioning pin 9', shown in FIG. 11, is fitted into a supporting groove 39' of generally U-shaped cross section, which is formed on a contact surface 3b of the split column 31. The positioning pin 9' is in contact with two contact points $C_2$ in the vicinity of the opening edge portions of a supporting groove 39'. A portion of the positioning pin 9' protruding from the contact surface 3b is in contact with a contact point $C_3$ on a bottom portion of a supporting groove 39A of a circular or flat U-shaped cross section, which is formed on a contact surface $3A_o$ of the adjacent end plate 3A. The supporting groove 39A is formed of a circular arc with a radius greater than that of the positioning pin 9'. Also, a small clearance e is formed between each contact surface 3b and $3A_o$.

In this case as well, similarly to each positioning pin 9 disposed on each contact surface 3b of the split members 31–34, each positioning pin 9' acts as a knock pin, and thus, the end plate 3A will be centered relative to the adjacent split column 31.

Moreover, in this case, at the time of centering the end plate 3A relative to the split column 31, the positioning pin 9' comes into contact with the corresponding supporting grooves 39', 3A at three contact points, and a three-point contact is maintained by the clearance e between the contact surfaces 3b and $3A_0$.

Thus, highly accurate positioning of the end plate 3A and the split column 31 becomes possible, and attachment and detachment of the positioning pin 9' relative to the supporting grooves 39', 39A become easy, thereby facilitating coupling and decoupling of the end plate 3A. In addition, the above-mentioned clearance e formed between the contact surfaces 3b, $3A_0$ may become null due to elastic deformation of the positioning pin 9' when the split column 31 and the adjacent end plate 3A are clamped together.

Also, the positioning pin 9' may come into contact with the supporting groove 39A of the end plate 3A at two contact points. Thus, the positioning pin 9' comes into contact with each of the supporting groove 39', 39A at four contact points. In this case as well, highly accurate positioning of the end plate 3A and the split column 31 becomes possible, and attachment and detachment of the positioning pin 9' relative to the supporting grooves 39', 39A become easy, thereby facilitating coupling and decoupling of the end plate 3A.

Figure 12:
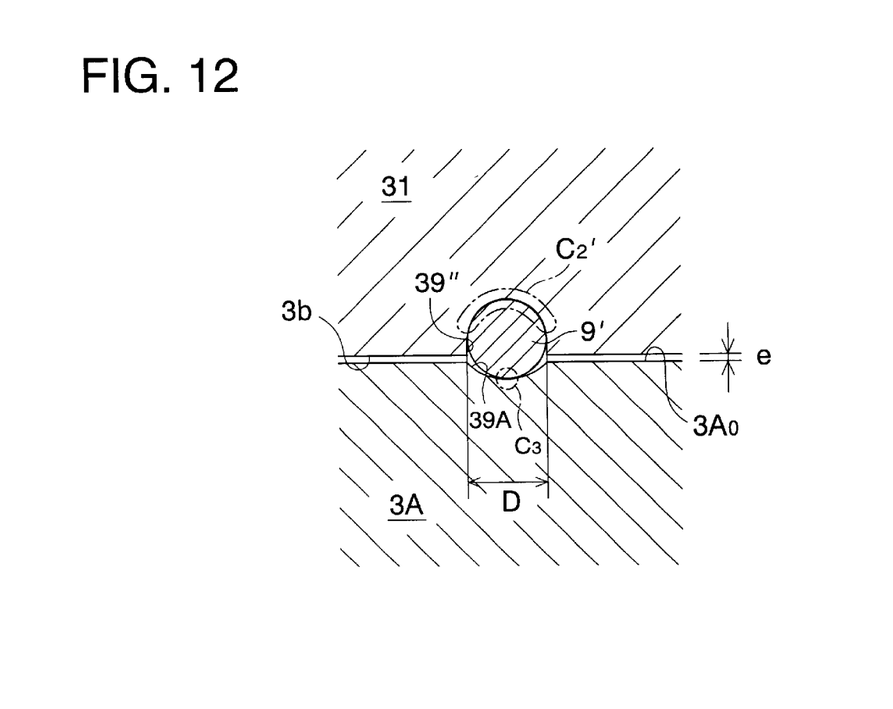
FIG. 12 shows another variant of FIG. 3, showing another fitting condition of a second positioning pin.

FIG. 12 shows a variant of FIG. 11. As shown in FIG. 12, the positioning pin 9' comes into contact with a supporting groove 39" of U-shaped cross section of the split column 31 at a region $C_2$' extending from a bottom portion of the supporting groove to the vicinities of the opening edge portions, and the supporting groove 39" covers a wider area than a semicircular portion of the cross section of the positioning pin 9'.

In this case as well, each positioning pin 9' acts as a knock pin and thus, the end plate 3A will be positioned or centered relative to the adjacent split column 31 with higher accuracy. Also, coupling and decoupling of the end plate 3A become easy. Furthermore, in this case, as shown in FIG. 12, since a pair of linear portions are formed at opposed opening edges of the supporting groove 39", measurement of the distance D of the opposed opening edges becomes easy, thereby facilitating measurement controls of the supporting grooves 39" by measuring the distance D.

Figure 13:
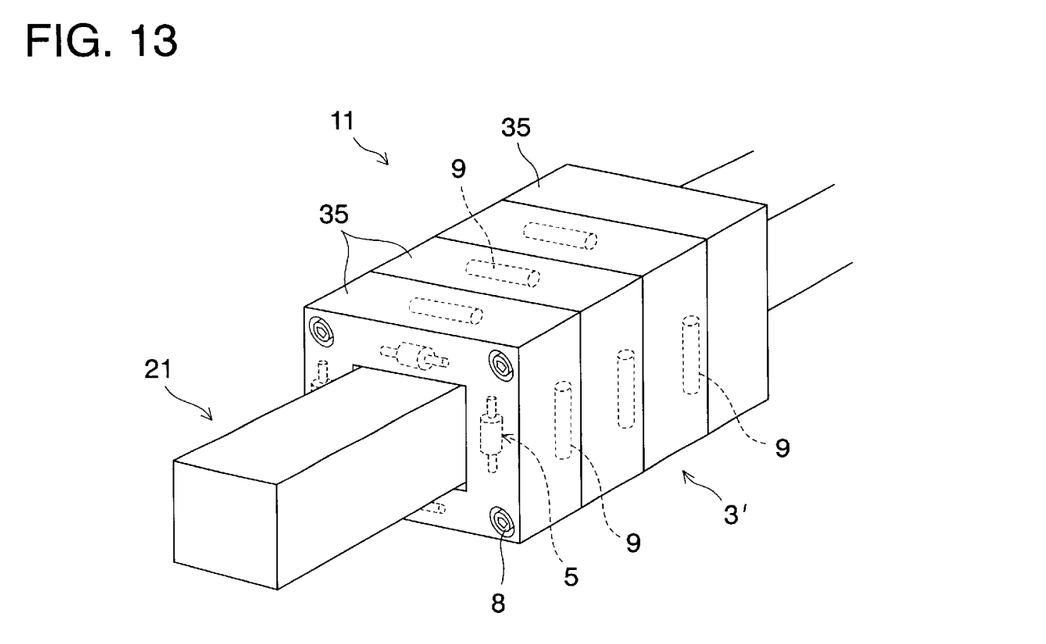
FIG. 13 is a perspective view of still another guide apparatus incorporating a centering mechanism of the present invention.

Next, FIG. 13 shows still another guide apparatus employing a positioning device according to the present invention. A guide apparatus 11 is constructed in such a way that a column 3' formed of a plurality of split members 35 is slidable along a shaft member 21 of square shape in cross section. The split members 35 are fastened to each other by through bolts 8. Each split member 35 has a slide mechanisms including a cylindrical roller as with the above-mentioned embodiment. Each contact surface of the adjacent split members 35 has positioning or centering pins 9 similar to the above-mentioned embodiment.

Figure 14:
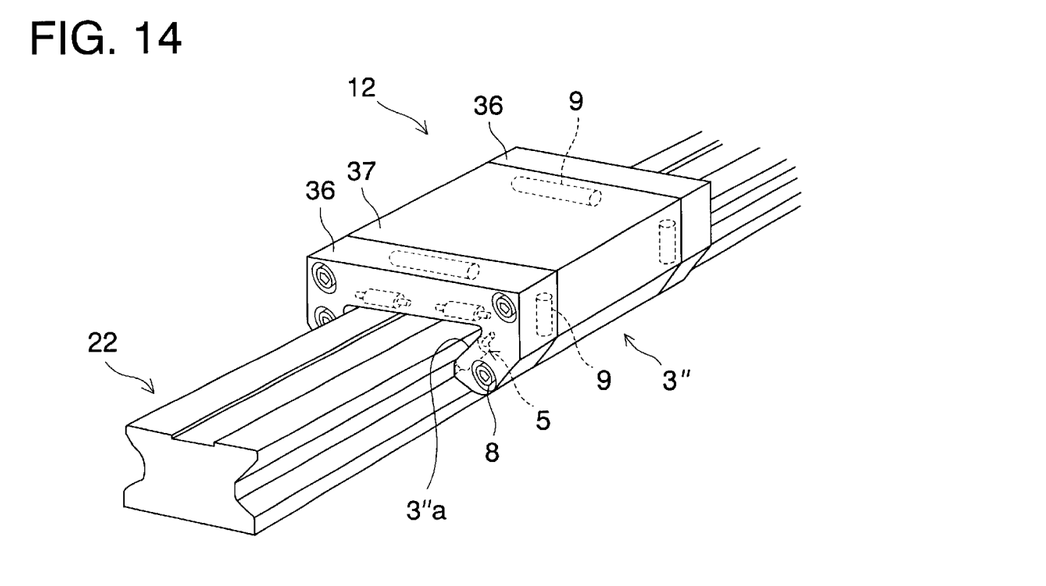
FIG. 14 is a perspective view of a linear guide incorporating a centering mechanism of the present invention.

FIG. 14 shows a linear guide incorporating a positioning device of the present invention. A linear guide 12 is structured in such a manner that a column or carriage 3" formed of a plurality of split members 36, 37 is mounted on and slidably movable along a rail member 22 of I-shaped cross section. The column or carriage 3" has a through groove 3"a formed therein. The split members 36, 37 are fastened to each other by through bolts 8. A slide mechanism 5 is provided inside each split member 36, 37 and a centering pin 9 is provided at each contact surface of the adjacent split members 36, 37 in the same manner as the previous embodiments. In FIGS. 13 and 14 as well, each split member of a column can be positioned or centered by the positioning pins 9, thereby allowing for manufacturing a longer column easily and precisely.

Figure 15:
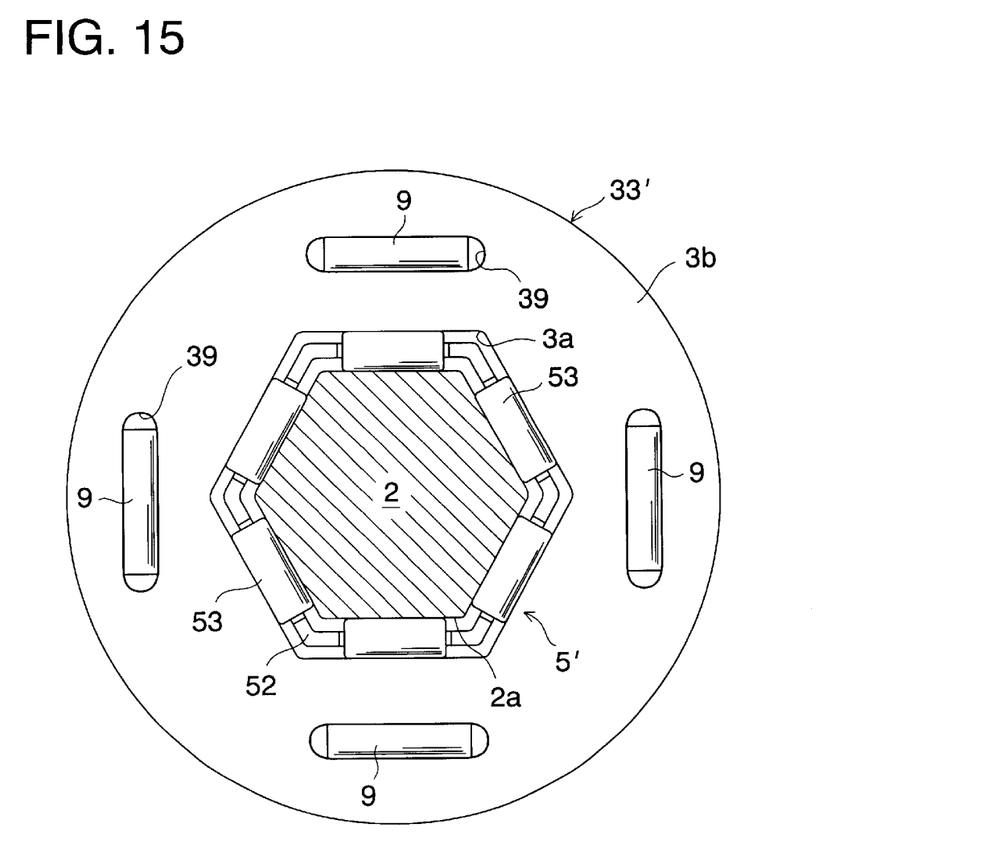
FIG. 15 is a lateral sectional view of a guide apparatus incorporating a needle roller bearing as a slide mechanism, corresponding to FIG. 8.
Figure 16:
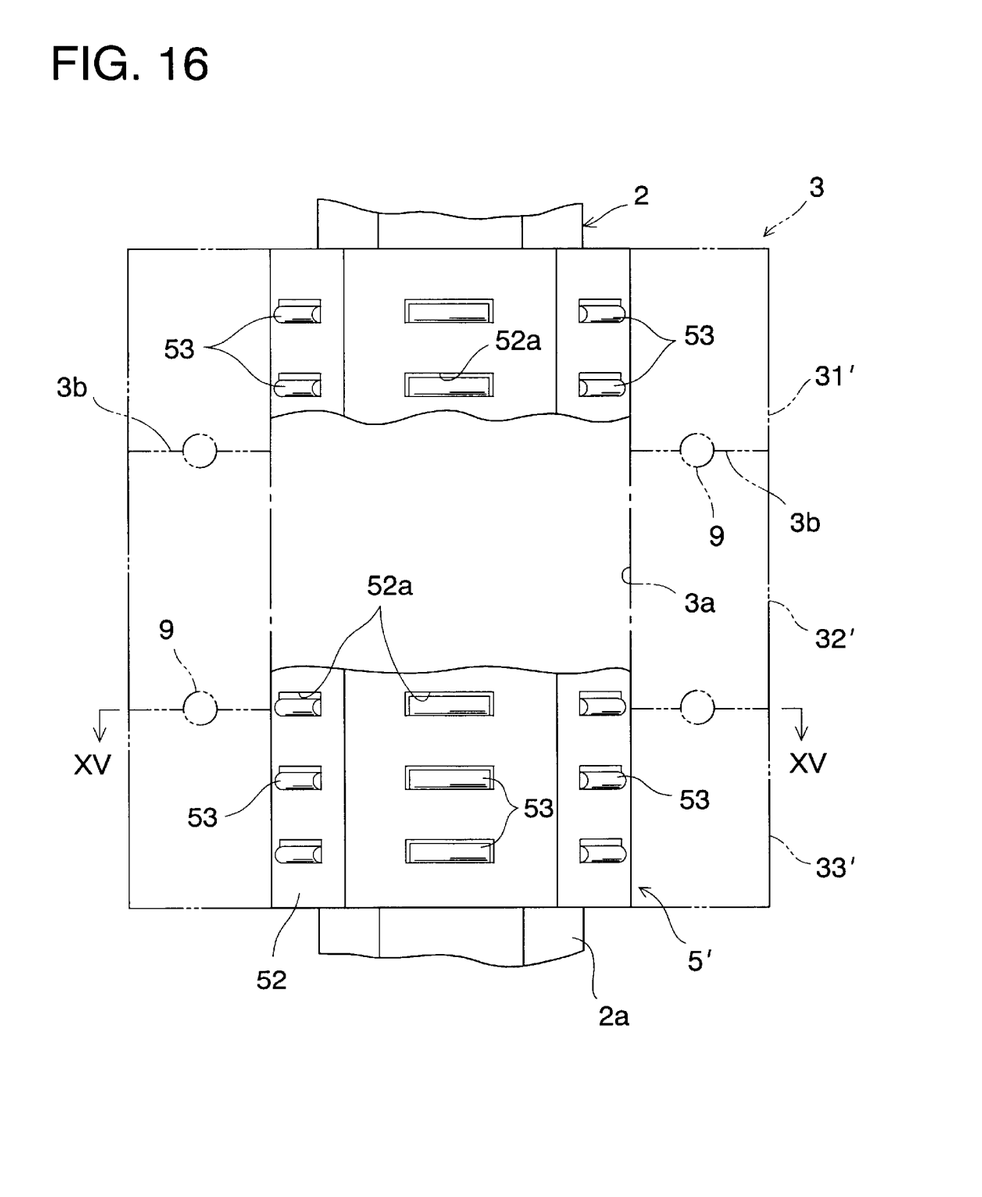
FIG. 16 is a side view of a guide apparatus of FIG. 15, corresponding to FIG. 5.

FIGS. 15 and 16 depict a guide apparatus employing a variant of the slide mechanism. FIG. 15 is a lateral side sectional view of the guide apparatus, corresponding to FIG. 8 of the previous embodiment, and FIG. 16 is a side view of the guide apparatus, corresponding to FIG. 5 of the previous embodiment. In FIG. 16, a column is shown in a double dotted line for illustration purposes.

As shown in FIGS. 15 and 16, a through hole 3a of a column 3 has a hexagonal cross section and an outer circumferential surface 2a of the shaft member 2 has a hexagonal cross section corresponding to the cross section of the through hole 3a. Between the through hole 3a of the column 3 and the outer circumferential surface 2a of the shaft member 2, a needle roller bearing 5' as a slide mechanism is interposed.

The needle roller bearing 5' includes a tubular retainer 52 of a hexagonal cross section corresponding to each hexagonal cross section of the column 3 and the shaft member 2, and a plurality of needle rollers 53 that are rotatably supported in a plurality of supporting holes 52a formed in the retainer 52 and that are adapted to roll on the inner circumferential surface of the through hole 3a of a column 3 and the outer circumferential surface 2a of the shaft member 2. At each contact surface 3b of the split members 31', 32' and 33', a plurality of positioning or centering pins 9, similar to the previous embodiments, are provided. In addition, the needle roller bearing 5' is disposed at least at opposite ends of the column 3 and several pieces of the needle roller bearing 5' are provided in the axial direction according to the axial length of the column 3. In this case as well, in the same manner as the previous embodiments, the split members are centered or located by the positioning pins 9, thereby providing for ease of manufacturing a longer column with accuracy.

Figure 17:
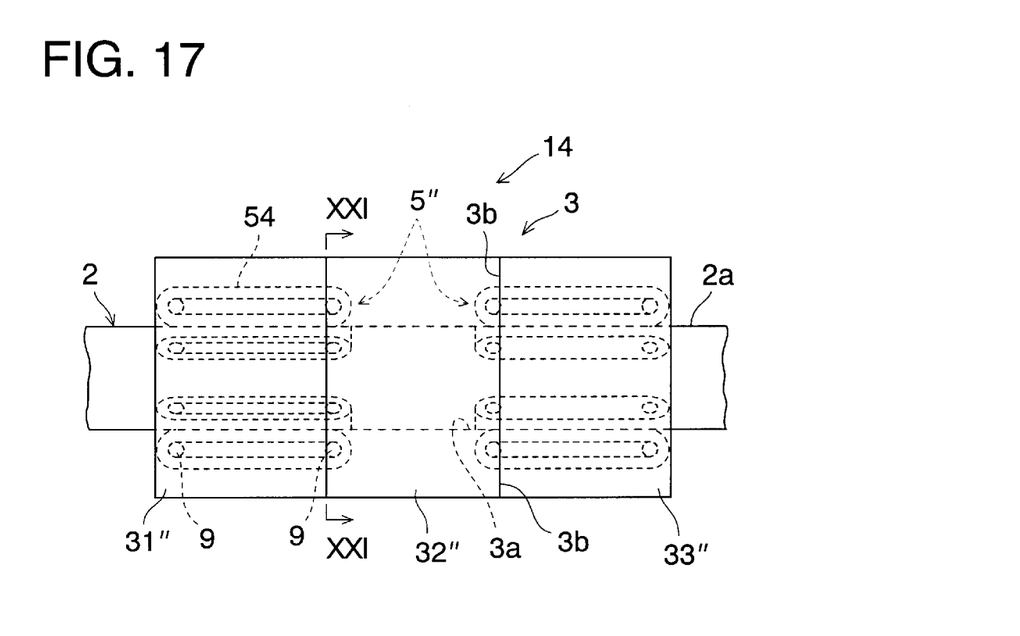
FIG. 17 is a side view of a guide apparatus incorporating a belt as a slide mechanism, corresponding to FIG. 5.
Figure 18:
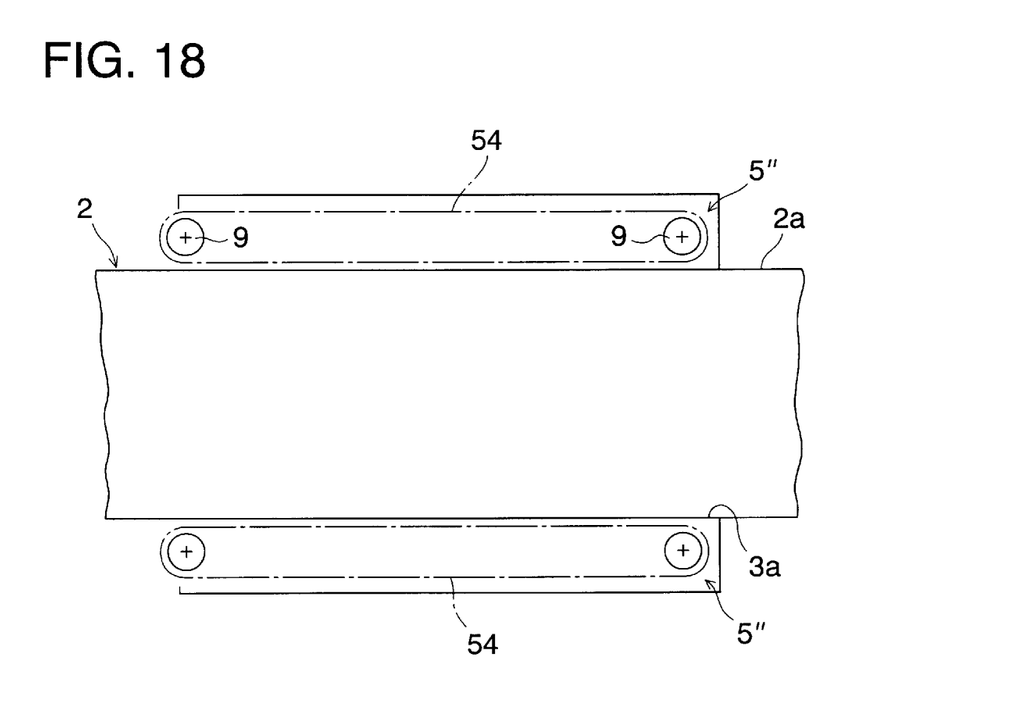
FIG. 18 is a longitudinal schematic sectional view of a guide apparatus of FIG. 17, illustrating a side view of the slide mechanism.
Figure 19:
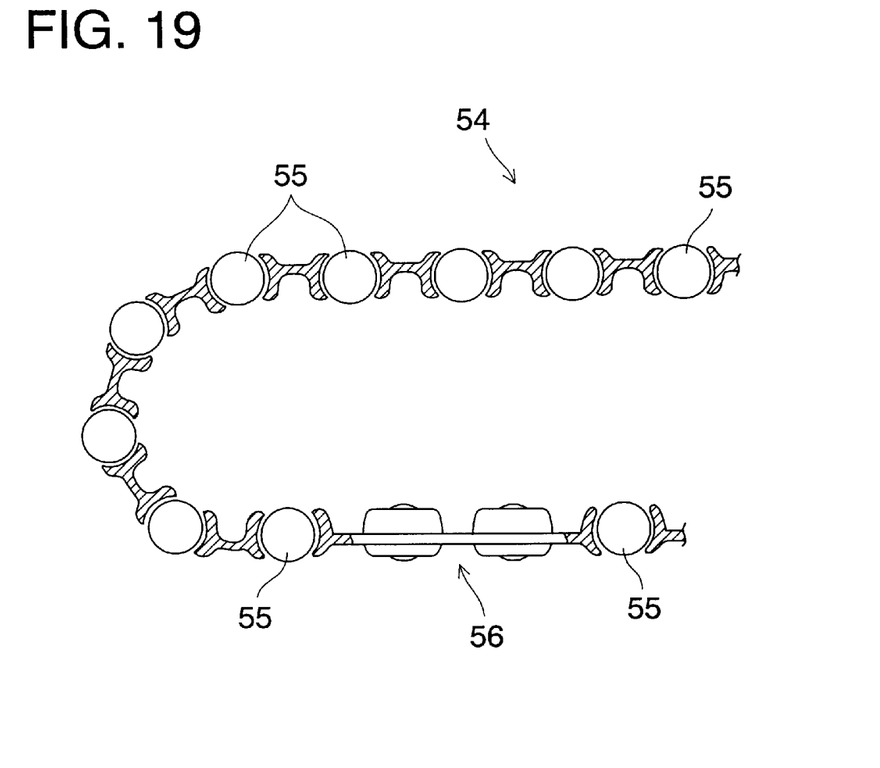
FIG. 19 is a partial side enlarged view including a longitudinal sectional view of a slide mechanism of FIG. 18.
Figure 20:
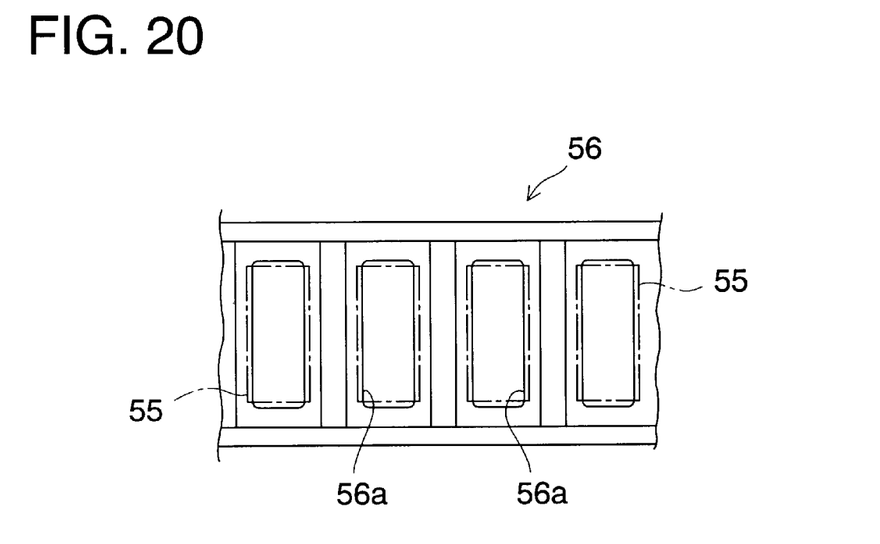
FIG. 20 is a partial plan view of a slide mechanism of FIG. 18.
Figure 21:
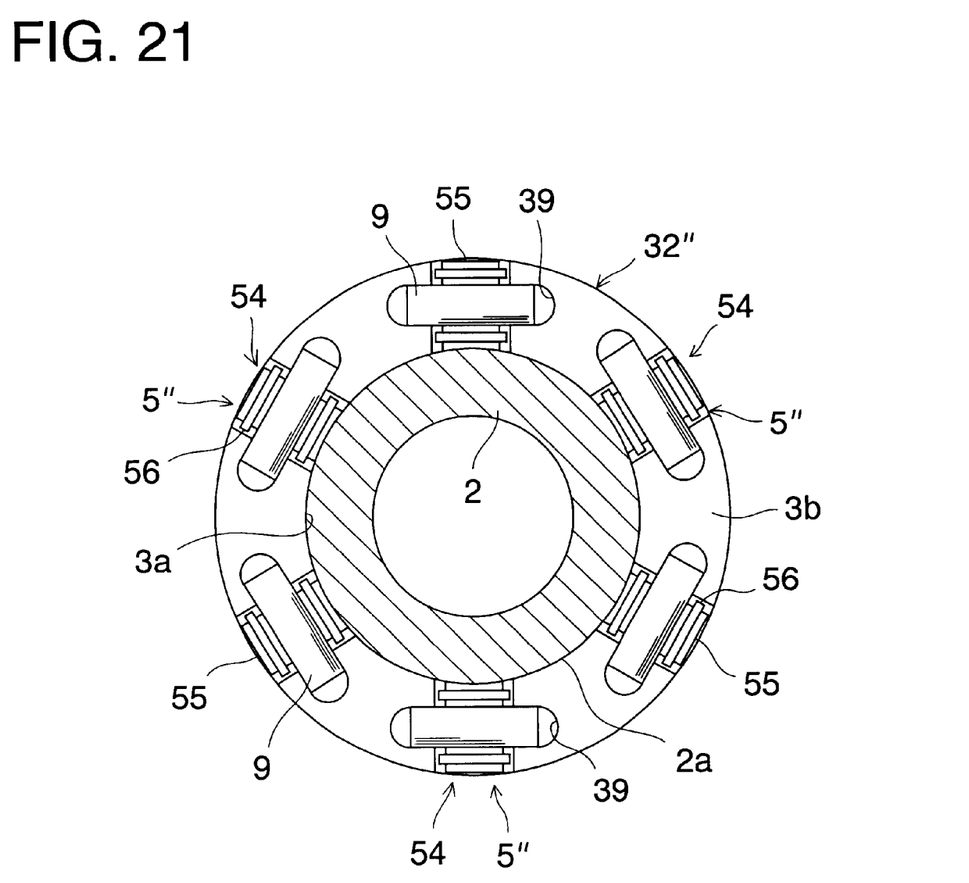
FIG. 21 is a sectional view taken along line XXI—XXI of FIG. 17, corresponding to FIG. 8.

FIGS. 17 to 21 show a guide apparatus incorporating a second variant of the slide mechanism. FIG. 17 is a side view of the guide apparatus, corresponding to FIG. 5 of the previous embodiment, FIG. 18 is a longitudinal sectional view of the guide apparatus, FIG. 19 is an enlarged side sectional view of a portion of the slide mechanism, FIG. 20 is a top plan view of a portion of FIG. 19, and FIG. 21 is a cross sectional view of FIG. 17 taken along line XXI—XXI, corresponding to FIG. 8 of the previous embodiment.

As shown in FIG. 17, a column 3 is composed of split members 31", 32" and 33", and a plurality of circulatable belt members 54 are provided to act as a slide mechanism 5". Six belt members 54, shown in FIG. 21, are provided at each split member and placed at equal circumferential spacings from each other.

Each belt member 54, shown in FIGS. 17 and 18, is wrapped around a pair of pins 9 each provided at an opening end portion of each split member. Also, each belt member 54, shown in FIGS. 19 and 20, is formed of a multiple of rollers 55 spaced equally, and a band-shaped, flexible, plastic retainer member 56 that extends in a loop and that has a multiple of supporting holes 56a to rotatably support the rollers 55. In FIG. 20, rollers 55 are shown in a dash-and-dot line, for illustration purposes. Pins 9 disposed on each contact surface 3b of the split members 31", 32" and 33", shown in FIG. 21, are inserted and supported in supporting grooves 39 formed on each contact surface 3b.

In operation, when the column 3 moves in the axial direction relative to the shaft member 2, each belt member 54 travels with the movement of the column 3. At this time, each roller 55 of the belt member 54 rolls on and travels along the outer circumferential surface 2a of the shaft member 2. In such a way, the movement of the column 3 is guided.

In this case, since the split members are centered or located using pins 9 that function as members which each belt member 54 is wrapped around, additional centering pin members are not required to center each split member, thereby decreasing the number of components and simplifying the whole structure. In addition, especially in the case of a belt member having a greater wrapping diameter, there may be provided a bushing (not shown) which is rotatable around a pin 9 and is wrapped around by a belt member.

Those skilled in the art to which the invention pertains may make modifications and other embodiments employing the principles of this invention without departing from its spirit or essential characteristics particularly upon considering the foregoing teachings. The described embodiments and examples are to be considered in all respects only as illustrative and not restrictive. The scope of the invention is, therefore, indicated by the appended claims rather than by the foregoing description. Consequently, while the invention has been described with reference to particular embodiments and examples, modifications of structure, sequence, materials and the like would be apparent to those skilled in the art, yet fall within the scope of the invention.

What is claimed is:

1. A positioning device for a guide apparatus having a column and an axially extending shaft member inserted into said column to allow relative axial movement between said column and said shaft member;

said column having a through hole or a through groove extending in an axial direction, said through hole or through groove receiving said shaft member;

a slide mechanism being interposed between said column and said shaft member, said slide mechanism including a plurality of rolling elements to slidably support said column relative to said shaft member;

said column being formed of a plurality of split members that are divided on sectional joint surfaces each perpendicular to said axial direction and that are joined to each other in said axial direction;

a plurality of supporting grooves of a U-shaped cross section being formed at each joint surface of each of said adjacent split members of said column, each of said supporting grooves corresponding to each other at said each joint surface being oppositely disposed, each of said split members of said column being centered by solid cylindrical positioning pins that are inserted into said supporting grooves oppositely disposed.

2. The positioning device according to claim 1, wherein said positioning pin is in contact with opening edge portions or two separate points in the vicinity of said opening edge portions of one of said adjacent supporting grooves and in contact with at least a point of the other of said adjacent supporting grooves at the time of centering said split members.

3. The positioning device according to claim 1, wherein said positioning pin is in contact with one of said adjacent supporting grooves at a region extending from a bottom portion of one of said adjacent supporting grooves to vicinities of said opening edge portions and in contact with the other of said adjacent supporting grooves at least at a point, at the time of centering said split members, said one of said supporting grooves covering a wider area than a semicircular portion of a round sectional shape of said positioning pin.

4. The positioning device according to claim 1, wherein said slide mechanism includes roller-shaped rolling elements that are received in a plurality of pockets formed on an inner circumferential surface of said through hole or through groove of said column, and supporting shafts each rotatably supporting each of said rolling elements received in said pockets.

5. The positioning device according to claim 1, wherein said through hole of said column has a polygonal cross sectional shape and said shaft member has a polygonal cross sectional shape corresponding to said polygonal cross sectional shape of said through hole, said slide mechanism being formed of a needle roller bearing interposed between said through hole of said column and an outer circumferential surface of said shaft member, said needle roller bearing including a tubular retainer of a polygonal cross sectional shape corresponding to each of said polygonal cross sectional shapes of said column and said shaft member, and a plurality of needle rollers that are rotatably supported in a plurality of supporting holes formed at said retainer and that roll on an inner circumferential surface of said through hole of said column and said outer circumferential surface of said shaft member.

6. The positioning device according to claim 1, wherein said slide mechanism includes a plurality of circulatable belts that are provided at said split members of said column and that extend in said axial direction, each of said belts including a plurality of equally spaced rollers along the length of said belts, a plastic, flexible retainer member extending in a loop-shape and having a plurality of supporting holes formed therein to support each of said rollers rotatably, and a pair of supporting shafts around which said each belt is wrapped, said supporting shaft functioning as said pin for centering each of said adjacent split members.

7. The positioning device according to claim 1, wherein said U-shaped cross section of a respective one of said supporting grooves has a sectional width greater than a diameter of a respective one of said positioning pins inserted into said respective one of said supporting grooves.

8. The positioning device according to claim 1, wherein said U-shaped cross section of a respective one of said supporting grooves has a sectional width smaller than a diameter of a respective one of said positioning pins inserted into said respective one of said supporting grooves.

9. The positioning device according to claim 1, wherein said U-shaped cross section of a respective one of said supporting grooves has a radius of curvature greater than a radius of a respective one of said positioning pins inserted into said respective one of said supporting grooves.

10. The positioning device according to claim 1, wherein said U-shaped cross section of a respective one of said supporting grooves has a radius of curvature smaller than a radius of a respective one of said positioning pins inserted into said respective one of said supporting grooves.

11. The positioning device according to claim 1, wherein said U-shaped cross section of a respective one of said supporting grooves has a depth measured from a plane of said joint surface that is greater than a radius of a respective one of said positioning pins inserted into said respective one of said supporting grooves.

12. The positioning device according to claim 1, wherein said U-shaped cross section of a respective one of said supporting grooves has a depth measured from a plane of said joint surface that is smaller than a radius of a respective one of said positioning pins inserted into said respective one of said supporting grooves.

13. A guide apparatus comprising:

a column that has a through hole or a through groove extending therethrough in an axial direction, and that comprises plural individual column members which are successively joined to one another in said axial direction respectively along joint surfaces between respective adjoining ones of said column members so as to form said column, wherein positioning grooves are provided in said column members on each of said joint surfaces such that respective ones of said positioning grooves of said adjoining column members align and mate with one another on said joint surfaces;

plural rolling elements arranged at an inner surface of said through hole or said through groove on one or more rolling element planes displaced in said axial direction away from planes of said joint surfaces;

a shaft member inserted into and extending along said through hole or said through groove and being movably supported by said plural rolling elements relative to said column to allow relative axial movement between said column and said shaft member in said axial direction; and positioning pins that are each respectively received in two aligned and mating ones of said positioning grooves provided on said joint surfaces of said respective adjoining ones of said column members so as to position said respective adjoining column members relative to one another through said positioning pins received in said positioning grooves;

wherein no roller elements are carried on said positioning pins and no roller elements are located on said planes of said joint surfaces.

* * * * *